United States Patent [19]

Streed

[11] Patent Number: 4,984,950
[45] Date of Patent: Jan. 15, 1991

[54] FISHING LURE HAVING A HINGE PIECE

[76] Inventor: Carl F. Streed, 628 Green Briar La., Lindenhurst, Ill. 60046

[21] Appl. No.: 467,737

[22] Filed: Jan. 19, 1990

[51] Int. Cl.$^5$ ............................................. A01K 85/00
[52] U.S. Cl. .................................................. 43/42.13
[58] Field of Search ...................... 43/41, 42.13, 42.23, 43/42.08, 42.11

[56] References Cited

U.S. PATENT DOCUMENTS

| | | | |
|---|---|---|---|
| 186,134 | 1/1877 | Jahne et al. | 43/42.74 |
| 4,209,932 | 7/1980 | Pate | 43/42.13 |
| 4,625,448 | 12/1986 | Barders | 43/42.13 |
| 4,815,233 | 3/1989 | Pingel | 43/42.13 |

*Primary Examiner*—Kurt Rowan
*Assistant Examiner*—James Miner
*Attorney, Agent, or Firm*—Charles F. Meroni, Jr.

[57] ABSTRACT

A fishing lure comprising a generally V-shaped wire. The V-shape wire has a truncated flat closed intermediate wire portion. The wire further has wire leg portions extending at approximately 45° angles away from opposite ends of the flat closed intermediate wire portion. One of the leg portions has a spinner attached to an outer free end thereof. Another of the leg portions has a fishing hook attached to an outer end thereof. A metallic hinge piece is provided having an axial bore extending along a longitudinal axis of the hinge piece. The truncated flat closed intermediate wire portion is extended through the axial bore on the hinge piece and with the wire leg portions act as stops to assist in maintaining the hinge piece in 360° rotating assembly on the truncated flat closed intermediate wire portion. The hinge piece has an annular table-like flange located between opposite ends of the hinge piece and with the annular table-like flange extending radially outwardly of the hinge piece. The annular table-like flange has an axially extending table bore extended there through. An axis of the table bore is positioned to be parallel to the longitudinal axis of the axial hinge piece base. A snap is secured with the axially extending table bore on the annular table-like flange for attachment to a fishing line.

5 Claims, 1 Drawing Sheet

FISHING LURE HAVING A HINGE PIECE

FIELD OF THE INVENTION

The invention relates to fishing lures. This device pertains to solid or stiff wire spinner baits only. It is a device that allows the lure to rotate 360 degrees when being cast from a rod and reel without having the line wrap around the lure.

BACKGROUND OF THE INVENTION

There are certain prior art references that are known to me which are believed to disclose inferior types of lures including the following patents:

| patentee | U.S. Pat. No. |
|---|---|
| Jahne et al. | 186,134 |
| Levake | 3,974,587 |
| Pate | 4,209,932 |
| Borders | 4,625,448 |
| Pingel | 4,815,233 |

The above listed patents all function in a similar manner but only two are for a solid wire spinner bait. One of the patents is Borders U.S. Pat. No. 4,625,448. The device shown on this patent has three bends in the wire to hold it in place, and this cannot be used with a quick change snap. Another of the patents is U.S. Pat. No. 4,209,932. This patent shows a device which is not as sturdy as my hinge piece on my line in that it requires four bends in the wire to hold it in place. Should the top and bottom arms be slightly bent toward each other, the device will not perform as described.

SUMMARY OF INVENTION

The device I have invented makes a lure easier to manufacture, as it requires only two bends in the wire. If the top and bottom arms of the lure are slightly bent toward each other, it will still perform. It can also be used with a quick change snap for faster changing of lures. It is of strong design and is made of metal.

A fishing lure including a metallic wire, the wire having a truncated flat closed intermediate wire portion, the wire further having wire leg portions extending away from opposite ends of said flat closed intermediate wire portion, one of said leg portions having a spinner attached to an outer free end thereof, another of said leg portions having a fishing hook attached to an outer end thereof, a one piece compression formed metallic hinge piece having an axial bore extending along a longitudinal axis of said hinge piece, said truncated flat closed intermediate wire portion being extended through said axial bore on said hinge piece and with said wire leg portions acting as stops assisting in maintaining said hinge piece in 360° rotating assembly on said truncated flat closed intermediate wire portion, said one piece compression formed hinge piece having an integral annular table-like flange between opposite ends of the hinge piece and with said annular table-like flange extending radially outwardly of said hinge piece, said hinge piece comprising a bushing of essentially uniform outside diameter along its length except at a compression formed juncture with said annular table-like flange, the annular table-like flange having a diameter exceeding the outside diameter of said bushing, said annular table-like flange having an axially extending table bore extended there through, an axis of said table bore being parallel to said longitudinal axis of said axial hinge piece base, said table bore providing means for attaching a fishing line to said annular table-like flange on said one piece compression formed hinge piece.

A fishing lure comprising a generally V-shaped wire, the V-shape wire having a truncated flat closed intermediate wire portion, the wire further having wire leg portions extending at approximately 45° angles away from opposite ends of the flat closed intermediate wire portion, one of the leg portions having a spinner attached to an outer free end thereof, another of the leg portions having a fishing hook attached to an outer end thereof, a metallic hinge piece having an axial bore extending along a longitudinal axis of said hinge piece, the truncated flat closed intermediate wire portion being extended through the axial bore on said hinge piece and with the wire leg portions acting as stops assisting in maintaining the hinge piece in 360° rotating assembly on the truncated flat closed intermediate wire portion, the hinge piece having an annular table-like flange between opposite ends of the hinge piece and with the annular table-like flange extending radially outwardly of said hinge piece, the annular table-like flange having an axially extending table bore extended there through, an axis of the table bore being parallel to the longitudinal axis of the axial hinge piece base, and a snap secured with the axially extending table bore on the annular table-like flange for attachment to a fishing line.

DESCRIPTION OF THE PREFERRED EMBODIMENT

Figure 1:
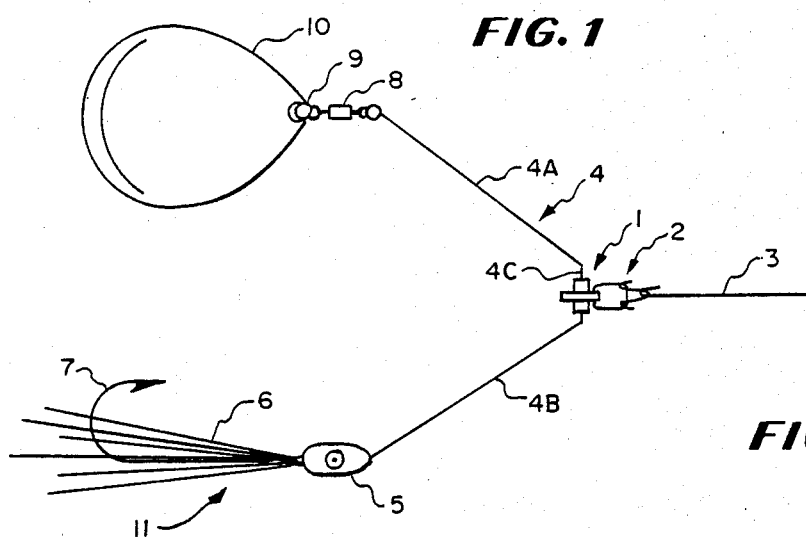
FIG. 1 is a top plan view of my fishing lure having my new and improved hinge piece embodying important features of my invention.
Figure 2:
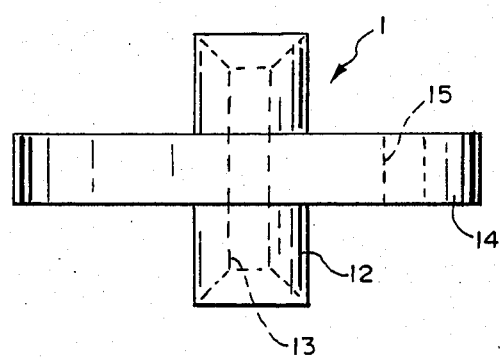
FIG. 2 is a side view of the hinge piece illustrated in FIG. 1.
Figure 3:
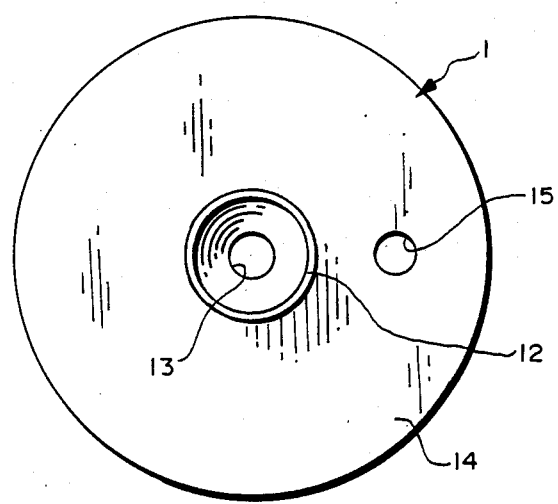
FIG. 3 is an end view of the hinge piece shown in FIG. 1.
Figure 4:
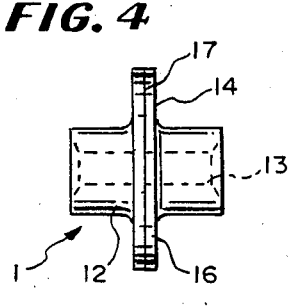
FIG. 4 is another side view of the hinge piece.
Figure 5:
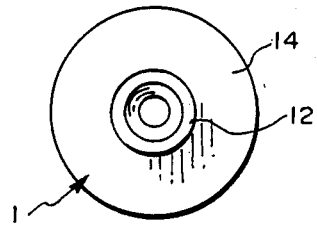
FIG. 5 is another end view of my hinge piece.

We shall now refer to the drawings and more particularly to parts which shall now be identified by reference numeral. The reference numeral 1 has been used to identify my hinge piece. The hinge piece 1 is adapted to be mounted upon a fishing lure or spinner bait as indicated at 11. The lure 11 includes a quick change snap 2, and a fishing line 3 is adapted to be connected to the snap 2 and then to a rod and reel in a conventional manner.

My lure 11 further includes a metallic wire 4. The wire has a truncated flat closed intermediate wire portion 4C, and a pair of wire leg portions 4A and 4B. One of the leg portions 4A has a spinner blade 10 attached to an outer free end thereof. Another of the leg portions 4B has a fishing hook 7 attached to an outer end thereof with a skirt 6 extending about the hook 7. The skirt and the fishing hook are integrally secured as part of a composite lead head as indicated at 5 in the illustrated embodiment. It is this lead head 5 that is secured to the leg portion 4B at its free end.

My hinge piece 1 includes a bushing 12 mounted upon the truncated closed flat closed intermediate wire portion 4C as shown in FIG. 1. To this end, the truncated flat closed intermediate wire portion extends through an axial bore 13 disposed along a longitudinal axis of the hinge piece 1. The truncated flat closed intermediate wire portion 4C extends through the axial bore 13 on the hinge piece 1. The wire leg portions 4A and 4B co-act with the intermediate wire portion 4C to provide stops at opposite ends of the wire portion 4C to prevent the hinge piece 1 from being dislodged from the intermediate wire portion 4C. It will thus be seen that the hinge piece 1, when mounted on the intermediate leg portion 4C, is free to rotate 360 degrees on the intermediate wire portion 4C.

The hinge piece is of a one piece compression formed brass construction in its preferred embodiment. The hinge piece 1 has an integral annular table-like flange 14 that is provided between opposite ends of the hinge piece 1. The annular table-like flange 14 extends radially outwardly of the hinge piece 1. The hinge piece 1 itself comprises a bushing of essentially uniform outside diameter along its length except at a compression formed juncture with the annular table-like flange 14. The annular table-like flange 13 has a diameter exceeding the outside diameter of the bushing. The outside diameter of the table-like flange 14 may be of the order of 0.307" while the outside diameter of the bushing 12 may be of the order of 0.045". The length of the bushing 12 may be of the order of 0.255". The width of the flange 14 may be of the order of 0.050". The diameter of the axial bore 13 through the bushing 12 may be of the order of 0.115". The foregoing dimensions can be varied as may be required to carry out my invention but my hinge piece has been formed to operate successfully when dimensioned in the manner state. Excellent results can be attained where a hinge base 1 is manufactured from 0.118 brass and is provided with a bright nickel plate finish.

Now referring to the annular table-like flange 14, it will be further seen that it has an axially extending table bore 15 extending there through. The table-bore 15 has a horizontal axis that is parallel to the longitudinal axis of the bushing 12 of the axial hinge piece 1. The table-bore 15 provides me a place for attaching a fishing line to the annular table-like flange on the one-piece compression formed hinge piece 1. A quick change snap 2 may also be used to secure the fishing line to the hinge piece 1, as may be desired.

The table-like flange 14 has a radially outwardly facing surface 16 which is provided with an annular compression line 17 that results from the compression formation of the hinge piece when the hinge piece is put into a cold header machine and compressed to shape. The line 17 is otherwise known as a cold shut which is a process description of how the line is generated in a cold heading machine.

It is believed that my lure possesses the following advantages over the state of the art.

1. A lure with my hinge piece keeps the line from wrapping around the line when the line rotates 360° when cast from a rod an reel.
2. By using my hinge piece it allows a fisherman to have a choice of tying the hinge piece to the line or using a quick change snap to connect the hinge piece to a line.
3. Where my hinge piece is used in a fishing lure the vibrations of the spinner blade transmit more action to the skirt because of the freedom of the wire going through the hinge piece. Further, the line is not tied directly to the wire.
4. The hinge piece allows the use of a larger diameter wire to get the same results as a smaller diameter wire, because of the freedom of the wire going through the hinge piece thus making a strong lure.
5. The wire requires only two spaced bends to hold the hinge piece in place thus making the lure easier to manufacture.
6. The wires can be accidentally bent and the lure will still work (some of the prior art cannot claim this).
7. Since my hinge piece is formed from a single piece of metal and because of its design it is stronger and more durable than anything known before.

While only a preferred embodiment of the invention has been described in detail, the invention is not limited thereby and modifications can be made within the scope of the attached claims.

I claim:

1. A fishing lure comprising a generally V-shaped wire, the V-shape wire having a truncated flat closed intermediate wire portion, the wire further having wire leg portions extending at approximately 45° angles away from opposite ends of said flat closed intermediate wire portion, one of said leg portions having a spinner attached to an outer free end thereof, another of said leg portions having a fishing hook attached to an outer end thereof, a metallic hinge piece having an axial bore extending along a longitudinal axis of said hinge piece, said truncated flat closed intermediate wire portion being extended through said axial bore on said hinge piece and with said wire leg portions acting as stops assisting in maintaining said hinge piece in 360° rotating assembly on said truncated flat closed intermediate wire portion, said hinge piece having an annular table-like flange between opposite ends of the hinge piece and with said annular table-like flange extending radially outwardly of said hinge piece, said annular table-like flange having an axially extending table bore extended there through, an axis of said table bore being parallel to said longitudinal axis of said axial hinge piece base, and a snap secured with said axially extending table bore on said annular table-like flange.

2. A fishing lure including a metallic wire, the wire having a truncated flat closed intermediate wire portion, the wire further having wire leg portions extending away from opposite ends of said flat closed intermediate wire portion, one of said leg portions having a spinner attached to an outer free end thereof, another of said leg portions having a fishing hook attached to an outer end thereof, a one piece compression formed metallic hinge piece having an axial bore extending along a longitudinal axis of said hinge piece, said truncated flat closed intermediate wire portion being extended through said axial bore on said hinge piece and with said wire leg portions acting as stops assisting in maintaining said hinge piece in 360° rotating assembly on said truncated flat closed intermediate wire portion, said one piece compression formed hinge piece having an integral annular table-like flange between opposite ends of the hinge piece and with said annular table-like flange extending radially outwardly of said hinge piece, said hinge piece comprising a bushing of essentially uniform outside diameter along its length except at a compression formed juncture with said annular table-like flange, the annular table-like flange having a diameter exceeding the outside diameter of the bushing, said annular table-like flange having an axially extending table bore extended there through, an axis of said table bore being parallel to said longitudinal axis of said axial hinge piece base, said table bore providing means for attaching a fishing line to said annular table-like flange on said one piece compression formed hinge piece.

3. The lure of claim 2 wherein by said table-like flange has an annular compression line on a radially outer face of the table-like flange that results from the compression formation of said hinge piece.

4. The lure of claim 2 wherein said metallic hinge piece is comprised of 0.118 inch brass having a bright nickel plate finish.

5. In a fishing lure including a metallic wire, the wire having a truncated flat closed intermediate wire portion, the wire further having wire leg portions extending away from opposite ends of said flat closed intermediate wire portion, one of said leg portions having a spinner attached to an outer free end thereof, another of said leg portions having a fishing hook attached to an outer end thereof, the improvement comprising a one piece metallic hinge piece having an axial bore extending along a longitudinal axis of said hinge piece, said truncated flat closed intermediate wire portion being extended through said axial bore on said hinge piece and with said wire leg portions acting as stops assisting in maintaining said hinge piece in 360° rotating assembly on said truncated flat closed intermediate wire portion, said one piece hinge piece having an integral annular table-like flange between opposite ends of the hinge piece and with said annular table-like flange extending radially outwardly of said hinge piece, said hinge piece comprising a bushing of essentially uniform outside diameter along its length except at a juncture with said annular table-like flange, the annular table-like flange having a diameter exceeding the outside diameter of said bushing, said annular table-like flange having an axially extending table bore extended there through, an axis of said table bore being parallel to said longitudinal axis of said axial hinge piece base, said table bore providing means for attaching a fishing line to said annular table-like flange on said one piece hinge piece, and a snap secured with said axially extending table bore on said annular table-like flange.

* * * * *